(12) United States Patent
Takeshi et al.

(10) Patent No.: US 8,492,034 B2
(45) Date of Patent: Jul. 23, 2013

(54) ELECTROLYTE AND BATTERY

(75) Inventors: Kazumasa Takeshi, Kanagawa (JP); Hiroyuki Morioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 12/865,051

(22) PCT Filed: Jan. 28, 2009

(86) PCT No.: PCT/JP2009/051315
§ 371 (c)(1), (2), (4) Date: Jul. 28, 2010

(87) PCT Pub. No.: WO2009/098977
PCT Pub. Date: Aug. 13, 2009

(65) Prior Publication Data
US 2010/0323247 A1    Dec. 23, 2010

(30) Foreign Application Priority Data
Feb. 6, 2008    (JP) ................................ 2008-026356

(51) Int. Cl.
*H01M 6/18*    (2006.01)
(52) U.S. Cl.
USPC ........... 429/304; 429/321; 429/322; 429/323; 252/62.2
(58) Field of Classification Search
USPC .................. 429/304, 321, 322, 323; 252/62.2
See application file for complete search history.

(56) References Cited

U.S. PATENT DOCUMENTS

| | | | |
|---|---|---|---|
| 6,777,133 B2 | 8/2004 | Hinokuma et al. | |
| 6,821,665 B2 | 11/2004 | Hinokuma et al. | |
| 7,128,888 B2 | 10/2006 | Li et al. | |
| 7,153,608 B2 | 12/2006 | Hinokuma et al. | |
| 7,157,183 B2 | 1/2007 | Hinokuma et al. | |
| 7,578,990 B2 | 8/2009 | Li et al. | |
| 7,651,803 B2 | 1/2010 | Hinokuma et al. | |

FOREIGN PATENT DOCUMENTS

| | | |
|---|---|---|
| JP | 07-296799 | 11/1995 |
| JP | 2001-52747 | * 2/2001 |
| JP | 2002-063918 | 2/2002 |
| JP | 2004-055562 | 2/2004 |
| JP | 2004-234949 | 8/2004 |
| JP | 2005-116327 | 4/2005 |
| JP | 3951225 | 5/2007 |
| JP | 2007-221008 | 8/2007 |
| JP | 2008-069015 | 3/2008 |
| JP | 2008-181751 | 8/2008 |
| JP | 2008-300173 | 12/2008 |

OTHER PUBLICATIONS

International Search Report dated Apr. 22, 2009, for corresponding Patent Application PCT/JP2009/051315.

* cited by examiner

*Primary Examiner* — Laura Weiner
(74) *Attorney, Agent, or Firm* — K&L Gates LLP

(57) ABSTRACT

A battery using an electrolyte with which favorable ion conductivity is able to be secured at low temperature is provided. A solid electrolyte is provided between a cathode in which a cathode active material layer is formed on a cathode current collector and an anode in which an anode active material layer is formed on an anode current collector. The electrolyte contains carbon cluster such as fullerene and an electrolyte salt such as a lithium salt. Thereby, compared to an electrolyte composed of a polymer compound such as polyethylene oxide and a lithium salt, lowering of ion conductivity is inhibited at low temperature.

10 Claims, 2 Drawing Sheets

ELECTROLYTE AND BATTERY

CROSS REFERENCE TO RELATED APPLICATIONS

The present application is a National Stage of International Application No. PCT/JP2009/051315 filed on Jan. 28, 2009 and which claims priority to Japanese Patent Application No. 2008-026356 filed on Feb. 6, 2008, the entire contents of which are being incorporated herein by reference.

BACKGROUND

The present disclosure relates to an electrolyte containing an electrolyte salt and a battery using the same.

In recent years, portable electronic devices such as combination cameras (videotape recorder), mobile phones, and notebook personal computers have been widely used, and it is strongly demanded to reduce their size and weight and to achieve their long life. Accordingly, as a power source of the portable electronic devices, a battery, in particular a lightweight secondary batter capable of providing a high energy density has been developed. Specially, a secondary battery using insertion and extraction of lithium as an electrode reactant for charge and discharge reaction (so-called lithium ion secondary battery) is extremely prospective, since such a secondary battery is able to provide a higher energy density compared to a lead battery and a nickel cadmium battery.

As an electrolyte of the lithium ion secondary battery, a liquid electrolyte (electrolytic solution) in which a lithium salt as an electrolyte salt is dissolved in an ester carbonate solvent is widely used. However, in the battery using the electrolytic solution, there is a possibility that the electrolytic solution is leaked, and thereby there is a possibility that neighboring electronic parts are destroyed. Thus, it has been proposed to use a solid electrolyte instead of the electrolytic solution. Examples of the solid electrolyte include an inorganic solid electrolyte and an organic solid electrolyte. In the case of using the inorganic solid electrolyte, it is difficult to form a favorable interface between each of the cathode and the anode, and the flexibility is low. Thus, the organic solid electrolyte attracts attention.

As the organic solid electrolyte used for secondary batteries, an electrolyte composed of a polymer compound and an electrolyte salt is widely known. Researches have been actively made on a solid electrolyte using a polyether compound represented by polyethylene oxide as the polymer compound.

As an electrolyte film having proton conductance used for a fuel cell, a perfluoro sulfonic acid resin is widely used. In addition, a technology using carbon cluster such as fullerene and carbon nanotube having a proton dissociable group, and a technology using a polymer compound in which each carbon cluster having an ion dissociable functional group is linked to each other with a linking group in between have been known (for example, refer to Patent documents 1 and 2). For the foregoing carbon cluster, a technology using the carbon cluster as a material of an anode active material and as an additive of an electrolytic solution in secondary batteries has been considered (for example, refer to Patent documents 3 and 4).

Patent document 1: Japanese Patent No. 3951225
Patent document 2: Japanese Unexamined Patent Application Publication No. 2004-055562
Patent document 3: Japanese Unexamined Patent Application Publication No. 2005-116327
Patent document 4: Japanese Unexamined Patent Application Publication No. 2004-234949

SUMMARY

However, in the foregoing solid electrolyte containing the polymer compound used for secondary batteries, lithium ions dissociated in the polymer compound are moved by segment movement of polymer chain, and thereby ion conductance is generated. Thus, at low temperature, there is a tendency that such segment movement is lowered, and ion conductivity is significantly lowered. Therefore, it has been difficult to remain favorable battery characteristics in a wide temperature range.

In view of the foregoing problem, it is desirable to provide an electrolyte with which favorable ion conductivity is able to be secured at low temperature and a battery using the same.

An electrolyte of an embodiment is a solid electrolyte, and contains carbon cluster and an electrolyte salt containing at least one of an alkali metal salt and an alkali earth metal salt.

A battery of an embodiment includes a cathode, an anode, and a solid electrolyte. The solid electrolyte contains carbon cluster and an electrolyte salt containing at least one of an alkali metal salt and an alkali earth metal salt.

According to the electrolyte of the embodiment, the carbon cluster is contained. Thus, even though the electrolyte is the solid electrolyte, favorable ion conductivity is able to be secured at low temperature. Thereby, according to the battery including the electrolyte, lowering of ion conductance at low temperature of the electrolyte is inhibited, and thus favorable battery characteristics are able to be retained.

Additional features and advantages are described herein, and will be apparent from, the following Detailed Description and the figures.

DETAILED DESCRIPTION

Figure 1:
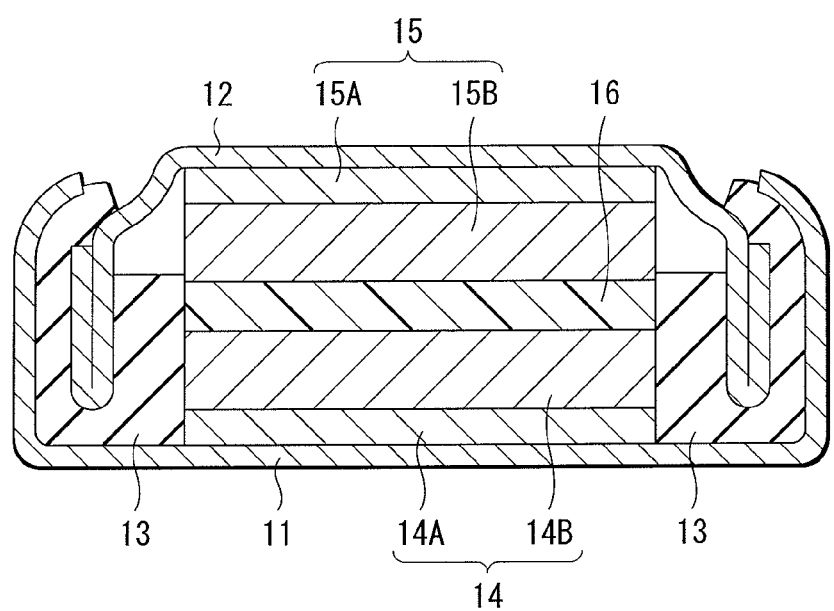
FIG. 1 is a cross sectional view illustrating a structure of a first battery according to an embodiment.

An embodiment will be hereinafter described in detail with reference to the drawings.

An electrolyte according to an embodiment is a solid electrolyte used for an electrochemical device such as, for example a battery, and contains carbon cluster and an electrolyte salt. The "carbon cluster" means a substance which has carbon as a main element and in which from several tens to several hundreds of atoms are bound, or in which such bound atoms are aggregated or crystallized.

The electrolyte contains the carbon cluster for the following reason. If the electrolyte contains the carbon cluster, ion conductivity is able to be favorably retained at low temperature differently from a polymer containing polyethylene oxide or ethylene oxide in which cation is moved by segment movement of polymer chain.

Examples of the carbon cluster include a spherical structure, a basket structure, a planate structure, and a cylindrical structure. Such a structure may be used singly, or a plurality thereof may be used by mixture. Further, a single crystal thereof may be used, or a multicrystal thereof may be used.

Examples of the spherical structure include fullerene and a derivative thereof. The derivative is formed by, for example, introducing an atom group such as a functional group into fullerene, which is similarly applied to the following descriptions. Examples of fullerene include C36, C60, C70, C76, C78, C80, C82, C84, C86, C88, C90, C92, C94, and C96. Examples the derivative of fullerene include an oxide and a hydride of the foregoing fullerene. Specially, C60 fullerene or an oxide thereof is preferable, since they are easily available comparatively, and is able to secure favorable ion conductivity at low temperature.

Examples of the basket structure include a defective of the spherical structure. Specific examples thereof include a defective of the foregoing fullerene and the derivatives thereof. The "defective" has an open structure obtained by, for example, losing partial atoms of the spherical structure, and means a by-product or the like generated in producing a structure called soot. The meaning of the defective is similarly applied to the following descriptions.

Examples of the planate structure include graphene, a derivative thereof, and a defective thereof. Examples of the cylindrical structure include carbon nanotube, a derivative thereof, and a defective thereof.

The carbon cluster is preferably at least one selected from the group consisting of fullerene, carbon nanotube, graphene, a hydride of fullerene, a hydride of carbon nanotube, a hydride of graphene, an oxide of fullerene, an oxide of carbon nanotube, an oxide of graphene, and defectives thereof, since thereby high effect is able to be obtained.

The electrolyte salt has, for example, an electrode reactant of a battery as cation, and contains at least one of an alkali metal salt and an alkali earth metal salt. Examples of the alkali metal salt include a lithium salt, a sodium salt, and a potassium salt. Specific examples of the lithium salt include lithium hexafluorophosphate (LiPF6), lithium tetrafluoroborate (LiBF4), lithium perchlorate (LiClO4), lithium hexafluoroarsenate (LiAsF6), lithium tetraphenylborate (LiB(C6H5)4), lithium bis(trifluoromethanesulfonyl)imide (LiN(CF3SO2)2), lithium bis(pentafluoroethanesulfonyl)imide (LiN(C2F5SO2)2), lithium (trifluoromethanesulfonyl)(pentafluoroethanesulfonyl)imide (LiN(CF3SO2)(C2F5SO2)), lithium (trifluoromethanesulfonyl)(heptafluoropropanesulfonyl)imide (LiN(CF3SO2)(C3F7SO2)), lithium (trifluoromethanesulfonyl)(nonafluorobutanesulfonyl)imide (LiN(CF3SO2)(C4F9SO2)), lithium 1,2-perfluoroethanedisulfonyl imide, lithium 1,3-perfluoropropanedisulfonyl imide, lithium 1,3-perfluorobutanedisulfonyl imide, lithium 1,4-perfluorobutanedisulfonyl imide, and lithium tris(trifluoromethanesulfonyl)methide (LiC(CF3SO2)3). Such a salt may be used singly, or a plurality thereof may be used by mixture.

The ratio (molar ratio) M1/M2 between the number of mols of the carbon cluster (M1) and the number of mols of the electrolyte salt (M2) in the electrolyte is voluntarily set, but is preferably in the range from 1/4 to 4/1, both inclusive, since thereby high effect is able to be obtained.

In forming the electrolyte, for example, the electrolyte is preferably formed by pulverizing and mixing a given amount of the carbon cluster and a given amount of the electrolyte salt at a solid phase. Thereby, the foregoing electrolyte is able to be easily formed.

As described above, the electrolyte in this embodiment is the solid electrolyte, and contains the carbon cluster and the electrolyte salt containing at least one of the alkali metal salt and the alkali earth metal salt. Thereby, differently from the existing solid electrolyte composed of a polymer compound such as polyethylene oxide and an electrolyte salt, intense lowering of the ion conductivity caused by inhibition of segment movement of polymer chain does not exist at low temperature, and ion conductivity is favorably retained in a wide temperature range. In this embodiment, the electrolyte may be a powdery mixture containing the carbon cluster and the electrolyte salt, or may be a substance obtained by hardening the powdery mixture.

Since the electrolyte contains the carbon cluster, favorable ion conductivity is able to be secured at low temperature though the electrolyte is the solid electrolyte. Thus, in the case where the electrolyte is used for an electrochemical device such as a battery, the electrolyte is able to contribute to retaining favorable battery characteristics at low temperature. Further, in the case where the carbon cluster is at least one selected from the group consisting of fullerene, carbon nanotube, graphene, a hydride of fullerene, a hydride of carbon nanotube, a hydride of graphene, an oxide of fullerene, an oxide of carbon nanotube, an oxide of graphene, and defectives thereof, or in the case where the electrolyte salt is at least one of a lithium salt, a sodium salt, and a potassium salt, high effect is able to be obtained.

Next, a description will be given of a usage example of the foregoing electrolyte. As an example of the electrochemical devices, a battery will be taken as an example. The electrolyte is used as follows.

(First Battery)

FIG. 1 illustrates a cross sectional structure of a first battery. The battery is, for example, a lithium ion secondary battery in which the capacity of an anode is expressed by a capacity based on insertion and extraction of lithium as a battery reactant.

In the secondary battery, a cathode 14 contained in a package can 11 and an anode 15 contained in a package cup 12 are layered with an electrolyte 16 in between. The battery structure using the package can 11 and the package cup 12 is a so-called coin type battery.

Peripheral edges of the package can 11 and the package cup 12 are hermetically sealed by being caulked with a gasket 13. The package can 11 is in the shape of a shallow plate to contain the cathode 14, that is, in the shape of a so-called a petri dish, and becomes an external cathode of the secondary battery. The package can 11 is made of, for example, stainless, aluminum (Al), or a metal having a structure in which aluminum, stainless, and nickel (Ni) are sequentially layered in the thickness direction from the side of the cathode 14 to be contained therein. Further, the package cup 12 is in the shape of a petri dish to contain the anode 15, and becomes an external anode of the secondary battery. The package cup 12 is made of a metal such as stainless, aluminum, and iron (Fe) plated with nickel on the surface. The gasket 13 is made of, for example, an insulating material.

The cathode 14 has a structure in which, for example, a cathode active material layer 14B is provided on a single face of a cathode current collector 14A having a pair of opposed faces. The cathode current collector 14A is made of, for example, a metal material such as aluminum, nickel, and stainless. The cathode active material layer 14B contains, for example, as a cathode active material, one or more cathode materials capable of inserting and extracting lithium as an electrode reactant. If necessary, the cathode active material layer 14B may contain an electrical conductor, a binder or the like.

Examples of the cathode material capable of inserting and extracting lithium include a chalcogen compound not containing lithium such as iron sulfide (FeS2), titanium sulfide (TiS2), molybdenum sulfide (MoS2), niobium selenide (NbSe2), and vanadium oxide (V2O5), or a lithium-containing compound that contains lithium.

Specially, the lithium-containing compound is preferable, since a high voltage and a high energy density are able to be obtained. Examples of such a lithium-containing compound include a composite oxide containing lithium and a transition metal element and a phosphate compound containing lithium and a transition metal element. Specially, a compound containing at least one selected from the group consisting of cobalt, nickel, manganese, and iron is preferable, since thereby a higher voltage is able to be obtained. The chemical formula thereof is expressed by, for example, LixMIO2 or LiyMIIPO4. In the formula, MI and MII represent one or more transition metal elements. Values of x and y vary according to the charge and discharge state of a battery, and are generally in the range of $0.05 \leq x \leq 1.10$ and $0.05 \leq y \leq 1.10$.

Specific examples of the composite oxide containing lithium and a transition metal element include a lithium cobalt composite oxide (LixCoO2), a lithium nickel composite oxide (LixNiO2), a lithium nickel cobalt composite oxide (LixNi1-zCozO2 (z<1)), a lithium nickel cobalt manganese composite oxide (LixNi(1-v-w)CovMnwO2) (v+w<1)), and lithium manganese composite oxide having a spinel structure (LiMn2O4). Specially, a composite oxide containing nickel is preferable, since thereby a high capacity is obtained and superior cycle characteristics are obtained. Specific examples of the phosphate compound containing lithium and a transition metal element include lithium iron phosphate compound (LiFePO4) and a lithium iron manganese phosphate compound (LiFe1-uMnuPO4 (u<1)).

In addition, examples of the foregoing cathode material include an oxide such as titanium oxide, vanadium oxide, and manganese dioxide; sulfur; and a conductive polymer such as polyaniline and polythiophene.

The anode 15 has a structure in which, for example, an anode active material layer 15B is provided on a single face of an anode current collector 15A having a pair of opposed faces. The anode current collector 15A is preferably made of a metal material having favorable electrochemical stability, electric conductivity, and mechanical strength. Examples of the metal material include copper (Cu), nickel, and stainless. Specially, as the metal material, copper is preferable, since thereby high electric conductivity is able to be obtained.

In particular, as the metal material composing the anode current collector 15A, a metal material containing one or more metal elements not forming an intermetallic compound with lithium is preferable. If the intermetallic compound is formed with lithium, stress due to expansion and shrinkage of the anode current collector 15A in charge and discharge causes damage. In result, current collectivity is lowered, and the anode active material layer 15B is easily exfoliated. Examples of the metal element include copper, nickel, titanium (Ti), iron, and chromium (Cr).

The anode active material layer 15B contains, as an anode active material, one or more anode materials capable of inserting and extracting lithium. If necessary, the anode active material layer 15B may contain an electrical conductor, a binder and the like. The charge capacity of the anode material capable of inserting and extracting lithium is preferably larger than the charge capacity of the cathode active material.

Examples of the anode material capable of inserting and extracting lithium include a carbon material. Examples of the carbon material include graphitizable carbon, non-graphitizable carbon in which the spacing of (002) plane is 0.37 nm or more, and graphite in which the spacing of (002) plane is 0.34 nm or less. More specific examples thereof include pyrolytic carbon, coke, graphite, glassy carbon fiber, an organic polymer compound fired body, carbon fiber, activated carbon, and carbon black. Of the foregoing, the coke includes pitch coke, needle coke, petroleum coke and the like. The organic polymer compound fired body is obtained by firing at appropriate temperature and carbonizing a phenol resin, a furan resin or the like. In the carbon material, the crystal structure change associated with inserting and extracting lithium is very little. Therefore, a high energy density is thereby obtained and superior cycle characteristics are thereby obtained. In addition, the carbon material also functions as an electrical conductor, and thus the carbon material is preferably used.

Examples of the anode material capable of inserting and extracting lithium include a material that is capable of inserting and extracting lithium and has at least one of metal elements and metalloid elements as an element. Such an anode material is preferable, since a high energy density is thereby obtained. Such an anode material may be a simple substance, an alloy, or a compound of a metal element or a metalloid element, or may have one or more phases thereof at least in part. In the specification, "alloys" include an alloy containing one or more metal elements and one or more metalloid elements, in addition to an alloy composed of two or more metal elements. Further, "alloy" in the specification may contain a nonmetallic element. The structure thereof includes a solid solution, a eutectic crystal (eutectic mixture), an intermetallic compound, and a structure in which two or more thereof coexist.

Examples of the metal element or the metalloid element composing the anode material include a metal element or a metalloid element capable of forming an alloy with lithium. Specific examples include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Specially, at least one of silicon and tin is preferable, since silicon and tin have high ability to insert and extract lithium, and provide a high energy density.

Examples of a material containing at least one of silicon and tin include at least one selected from the group consisting of the simple substance, an alloy, and a compound of silicon; and the simple substance, an alloy, and a compound of tin. That is, examples thereof include the simple substance, an alloy, and a compound of silicon; the simple substance, an alloy, and a compound of tin; and a material having one or more phases thereof at least in part.

Examples of the alloy of silicon include an alloy containing at least one selected from the group consisting of tin, nickel, copper, iron, cobalt (Co), manganese (Mn), zinc, indium, silver, titanium, germanium, bismuth, antimony (Sb), and chromium as the second element other than silicon. Examples of the alloy of tin include an alloy containing at least one selected from the group consisting of silicon, nickel, copper, iron, cobalt, manganese, zinc, indium, silver, titanium, germanium, bismuth, antimony, and chromium as the second element other than tin.

Examples of the compound of silicon or the compound of tin include a compound containing oxygen (O) or carbon (C). The compound of silicon or the compound of tin may contain the foregoing second element in addition to silicon or tin.

In particular, as the material containing at least one of silicon and tin, a material containing the second element and the third element in addition to tin as the first element is preferable. The second element is at least one selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon. The third element is at least one selected from the group consisting of boron, carbon, aluminum, and phosphorus. In the case where the second element and the third element are contained, the cycle characteristics are improved.

Specially, a CoSnC-containing material that contains tin, cobalt, and carbon as an element, in which the carbon content is from 9.9 wt % to 29.7 wt % both inclusive, and the cobalt ratio to the total of tin and cobalt (Co/(Sn+Co)) is from 30 wt % to 70 wt % both inclusive is preferable. In such a composition range, a high energy density is able to be obtained.

The CoSnC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The CoSnC-containing material has a phase containing tin, cobalt, and carbon. Such a phase preferably has a low crystalline structure or an amorphous structure. Further, in the CoSnC-containing material, at least part of carbon as an element is preferably bonded with a metal element or a metalloid element as other element. Cohesion or crystallization of tin or the like is thereby inhibited.

Examples of a measurement method for examining bonding state of elements include X-ray Photoelectron Spectroscopy (XPS). In XPS, in the case of graphite, the peak of 1s orbit of carbon (C1s) is shown in 284.5 eV in the apparatus in which energy calibration is made so that the peak of 4f orbit of gold atom (Au4f) is obtained in 84.0 eV. In the case of surface contamination carbon, the peak is shown in 284.8 eV. Meanwhile, in the case of higher charge density of carbon element, for example, in the case where carbon is bonded with a metal element or a metalloid element, the peak of C1s is shown in the region lower than 284.5 eV. That is, in the case where the peak of composite wave of C1s obtained for the CoSnC-containing material is shown in a region lower than 284.5 eV, at least part of carbon contained in the CoSnC-containing material is bonded with the metal element or the metalloid element as other element.

In XPS, for example, the peak of C1s is used for calibrating the energy axis of spectrums. Since surface contamination carbon generally exists on a material surface, the peak of C1s of the surface contamination carbon is set to in 284.8 eV, which is used as an energy reference value. In XPS, the waveform of the peak of C1s is obtained as a form including the peak of the surface contamination carbon and the peak of carbon in the CoSnC-containing material. Therefore, for example, by performing analysis by using commercially available software, the peak of the surface contamination carbon and the peak of carbon in the CoSnC-containing material are separated. In the analysis of the waveform, the position of the main peak existing on the lowest binding energy side is set to the energy reference value (284.8 eV).

Further, examples of the anode material capable of inserting and extracting lithium include a metal oxide, a polymer compound and the like capable of inserting and extracting lithium. Examples of the metal oxide include iron oxide, ruthenium oxide, and molybdenum oxide. Examples of the polymer compound include polyacetylene, polyaniline, and polypyrrole.

It is needless to say that some of the foregoing anode materials capable of inserting and extracting lithium may be used by mixture.

Examples of the electrical conductor include a carbon material such as graphite, carbon black, and Ketjen black. Such a carbon material may be used singly, or a plurality thereof may be used by mixture. The electrical conductor may be a metal material, a conductive polymer molecule or the like as long as the material has the electric conductivity.

Examples of the binder include a synthetic rubber such as styrene-butadiene rubber, fluorinated rubber, and ethylene propylene diene; and a polymer material such as polyvinylidene fluoride. One thereof may be used singly, or a plurality thereof may be used by mixture.

The electrolyte 16 is composed of the foregoing electrolyte, since thereby favorable battery characteristics are able to be retained at low temperature. Further, since the electrolyte 16 is the solid electrolyte, liquid leakage, decomposition of the electrolyte and the like are not caused, and superior safety and superior cycle characteristics are obtained, differently from a case that a liquid electrolyte (electrolytic solution) or an electrolyte in which an electrolytic solution is retained by a polymer compound (gel electrolyte) is used.

In the case where the secondary battery is manufactured, for example, the cathode 14, the electrolyte 16, and the anode 15 are layered, the resultant laminated body is contained in the package can 11, the package cup 12 is put on the peripheral section of the package can 11, and the resultant is caulked and fixed through the gasket 13. Thereby, the secondary battery illustrated in FIG. 1 is completed.

In the secondary battery, when charged, for example, lithium ions are extracted from the cathode 14 and inserted in the anode 15 through the electrolyte 16. Meanwhile, when discharged, for example, lithium ions are extracted from the anode 15 and inserted in the cathode 14 through the electrolyte 16.

According to the secondary battery, in the case where the capacity of the anode 15 is expressed by the capacity component based on insertion and extraction of lithium, the foregoing electrolyte is included. Thus, lowering of ion conductance at low temperature of the electrolyte 16 is inhibited, and thus favorable battery characteristics are able to be retained. Further, since the electrolyte 16 is the solid electrolyte, liquid leakage that may be caused if a liquid electrolyte or an electrolyte in which an electrolytic solution is retained by a polymer compound is used is not generated, and decomposition of the electrolyte is inhibited even if charge and discharge are repeated. Thus, the electrolyte is able to contribute to improvement of safety and cycle characteristics. Further, compared to a case that a liquid electrolyte or an inorganic solid electrolyte is used, weight of the entire battery is able to be reduced.

(Second Battery)

The second battery has a structure, action, and effect similar to those of the first battery except that the structure of the anode 15 is different from that of the first battery, and is manufactured in procedure similar to that of the first battery. For the same elements as those of the first battery, the description thereof will be omitted.

The anode 15 has a structure in which, the anode active material layer 15B is provided on a single face of the anode current collector 15A as in the first battery. The anode active material layer 15B contains, for example, as an anode active material, a material containing silicon or tin as an element. Specifically, for example, the anode active material layer 15B contains the simple substance, an alloy, or a compound of silicon or the simple substance, an alloy, or a compound of tin, and may contain two or more thereof.

The anode active material layer 15B is formed by using vapor-phase deposition method, liquid-phase deposition method, spraying method, firing method, or a combination of two or more of these methods. The anode current collector 15A and the anode active material layer 15B are preferably alloyed in at least part of the interface thereof. Specifically, at the interface thereof, the element of the anode current collector 15A is preferably diffused in the anode active material layer 15B; or the element of the anode active material layer 15B is preferably diffused in the anode current collector 15A; or these elements are preferably diffused in each other. Thereby, destruction due to expansion and shrinkage of the anode active material layer 15B associated with charge and discharge is inhibited, and the electron conductivity between the anode active material layer 15B and the anode current collector 15A is able to be improved.

Examples of vapor-phase deposition method include physical deposition method and chemical deposition method. Specific examples thereof include vacuum deposition method, sputtering method, ion plating method, laser ablation method, thermal Chemical Vapor Deposition (CVD) method, and plasma CVD method. As liquid-phase deposition method, a known technique such as electrolytic plating and electroless plating is able to be used. Firing method is, for example, a method in which after coating is provided by mixing a particulate anode active material with a binder and the like and dispersing the resultant mixture in a solvent, heat treatment is provided at temperature higher than the melting point of the binder or the like. For firing method, a known technique such as atmosphere firing method, reactive firing method, and hot press firing method is able to be used as well.

EXAMPLES

A description will be given in detail of specific examples.

Examples 1-1 to 1-3

The foregoing electrolyte was formed by using fullerene oxide as carbon cluster.

First, the fullerene oxide was synthesized. In this case, 300 cm3 of a toluene solution (1 mmol/dm3) of C60 as fullerene (nanon purple, Frontier Carbon Corporation make, purity of 99% or more) was set in a three-neck flask attached with a thermometer, and the three-neck flask was heated up to 80 deg C. by an oil bath. After that, ozone gas (concentration: 30 g/m3) was introduced into the three-neck flask at a flow rate of 1.0 dm3/min. The toluene solution was bubbled for 300 seconds, and thereby reaction was initiated so that C60 was oxidized. At that time, temperature of the reacted toluene solution was lowered down to about 70 deg C. to 73 deg C. both inclusive. Subsequently, nitrogen gas was introduced into the three-neck flask for 300 seconds, and thereby the ozone gas in the three-neck flask was removed and the reaction thereof was stopped. The toluene solution was stirred for 30 minutes at 80 deg C. After that, the resultant was cooled down to room temperature, and thereby a fullerene oxide-containing toluene solution was obtained. Next, 1 dm3 of toluene was added to the fullerene oxide-containing toluene solution, which was refluxed for 1 hour, and then cooled down to room temperature. Subsequently, the refluxed fullerene oxide-containing toluene solution was filtered and divided into an insoluble portion and a soluble portion by a polytetrafluoroethylene (PTFE) membrane filter having a pore diameter of 1.0 μm. At this time, the insoluble portion contained C60Ox (x>6) as fullerene oxide, and the soluble portion contained C60Ox ($0 \leq x \leq 6$) as fullerene oxide. Finally, the insoluble portion was dried in vacuum at 80 deg C., and thereby C60Ox (x>6) was obtained.

Subsequently, in a glove box under argon atmosphere, C60Ox (x>6) as synthesized fullerene oxide and lithium bis(trifluoromethanesulfonyl)imide (LiTFSI: Sigma-Aldrich Co. make) as a lithium salt as an electrolyte salt were pulverized and mixed for about 10 minutes in a mortar, and thereby an electrolyte was formed. At this time, mixing was performed so that the ratio (molar ratio) M1/M2 between the number of mols of C60Ox (x>6) as carbon cluster (M1) and the number of mols of LiTFSI as an electrolyte salt (M2) became 1/1.

Examples 1-2 and 1-3

A procedure was taken in the same manner as in Example 1-1, except that the molar ratio M1/M2 was 1/2 (Example 1-2) or 1/4 (Example 1-3) instead of 1/1.

Example 1-4

A procedure was taken in the same manner as in Example 1-1, except that lithium hexafluoroarsenate (LiAsF6) was used instead of LiTFSI as an electrolyte salt. At this time, mixing was performed so that the ratio (molar ratio) M1/M2 between the number of mols of C60Ox (x>6) as carbon cluster (M1) and the number of mols of LiAsF6 as an electrolyte salt (M2) became 1/1.

Comparative Example 1

An electrolyte composed of polyethylene oxide (PEO) and LiTFSI was formed so that the ratio (EO:Li) between the number of mols of ethylene oxide (EO) as monomer unit of PEO and the number of mols of lithium (Li) contained in LiTFSI became 10:1. In this case, in a glove box under argon atmosphere, 0.5 g of polyethylene oxide (molar weight: 100000, Sigma-Aldrich Co. make) and 0.0326 g of LiTFSI were dissolved in 50 cm3 of acetonitrile, and the resultant solution was stirred for 12 hours. Next, the stirred solution was set in a petri dish composed of PTFE, which was air-dried under argon atmosphere. After that, the resultant was dried under vacuum atmosphere at 80 deg C., and thereby an electrolyte was formed.

Figure 2:
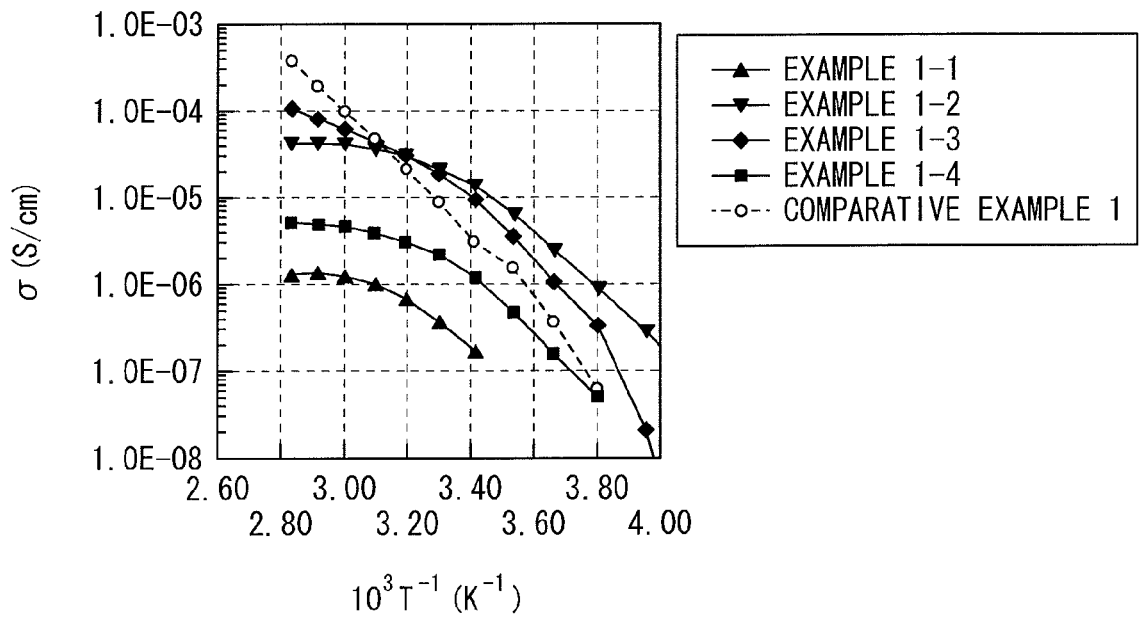
FIG. 2 is a diagram illustrating temperature characteristics of ion conductivity in an electrolyte (Examples 1-1 to 1-4 and Comparative example 1).

For the electrolytes of Examples 1-1 to 1-4 and Comparative example 1, impedance was measured at from −20 deg C. to 80 deg C. both inclusive to examine temperature characteristics of ion conductivity. In measuring impedance, in a dry room, after temperature of the electrolytes reached at given temperature and the electrolytes were retained for 1 hours, ion conductivity (σ; S/cm) was measured. After Arrhenius plotting was performed based on each ion conductivity value at each temperature, the results illustrated in FIG. 2 were obtained. In FIG. 2, the vertical axis represents ion conductivity σ with the use of logarithm, and the horizontal axis represents inverse T−1 (K−1) of temperature T (absolute temperature; K).

As illustrated in FIG. 2, in Examples 1-1 to 1-4 in which C60Ox (x>6) was contained, there was a tendency that the ion conductivity became almost constant when temperature was 50 deg C. or more (3.1*10-3 K−1 or less), and the ion conductivity was moderately lowered when temperature was lower than 50 deg C. (higher than 3.1*10-3 K−1). Meanwhile, in Comparative example 1 in which PEO was contained, as temperature was lowered, the ion conductivity was intensely lowered, and the absolute value of the slope of Examples 1-1 to 1-4 was smaller than that of Comparative example 1. The result showed the following. That is, in the electrolyte containing the polymer compound such as polyethylene oxide, as temperature was lowered, fragment movement of polymer chain was inhibited and the ion conductivity was significantly lowered. Meanwhile, in the electrolyte containing C60Ox (x>6) as fullerene oxide, lowering of the ion conductivity at low temperature was inhibited.

Accordingly, it was confirmed that in the solid electrolyte, in the case where the fullerene derivative and the lithium salt were contained, favorable ion conductivity was secured at low temperature. Therefore, it is expected that in a battery including such an electrolyte, favorable battery characteristics are able to be retained at low temperature.

Further, in comparison among Examples 1-1 to 1-3, it was found that in the case where temperature was 50 deg or more, as the ratio (molar ratio) of LiTFSI in the electrolyte was increased, the ion conductivity was increased. In addition, it was found that in the case where molar ratio M1/M2 between C60Ox (x>6) and LiTFSI was 1/2, high and stable ion conductivity was obtained in a wide temperature range. Further, in comparison between Example 1-1 and Example 1-4, it was suggested that in the electrolyte containing fullerene oxide, higher ion conductivity was obtained in the case of using LiAsF6 as an electrolyte salt than in the case of using LiTFSI as an electrolyte salt.

Examples 2-1 and 2-2

A procedure was taken in the same manner as in Example 1-1 or Example 1-4, except that C60 as fullerene was used instead of C60Ox (x>6) as carbon cluster. At this time, as an electrolyte salt, LiTFSI (Example 2-1) or LiAsF6 (Example 2-2) was used. In both examples, the molar ratio M1/M2 between the carbon cluster and the electrolyte salt was 1/1.

Figure 3:
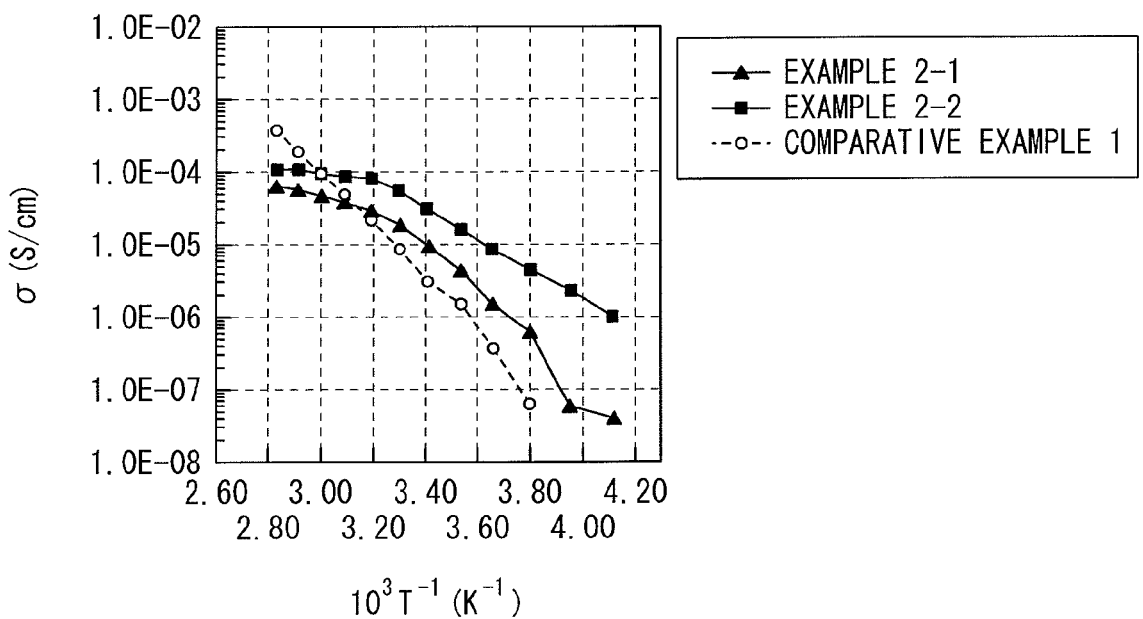
FIG. 3 is a diagram illustrating temperature characteristics of ion conductivity in other electrolyte (Examples 2-1 and 2-2, and Comparative example 1).

For Examples 2-1 and 2-2, temperature characteristics of ion conductivity were examined in the same manner as in Example 1-1. The results illustrated in FIG. 3 were obtained. In FIG. 3, the result of Comparative example 1 is illustrated together.

As illustrated in FIG. 3, in the case of using C60, results similar to the results illustrated in FIG. 2 were obtained. That is, in Examples 2-1 and 2-2 in which C60 was contained, there was a tendency that the ion conductivity became almost constant when temperature was 50 deg C. or more, and the ion conductivity was moderately lowered when temperature was lower than 50 deg C. Further, the absolute value of the ion conductivity slope that was lowered as temperature was lowered of Examples 2-1 and 2-2 was smaller than that of Comparative example 1. That is, it was shown that in the case of the electrolyte containing C60, lowering of the ion conductivity at low temperature was inhibited as well.

Accordingly, it was confirmed that in the solid electrolyte, in the case where fullerene and the lithium salt were contained, favorable ion conductivity was secured at low temperature. Therefore, it is expected that in a battery including such an electrolyte, favorable battery characteristics are able to be retained at low temperature.

Further, in comparison between Examples 2-1 and 2-2, it was also suggested that in the electrolyte containing fullerene, higher ion conductivity was obtained in the case of using LiAsF6 as an electrolyte sale than in the case of using LiTFSI as an electrolyte salt.

Further, from the results of FIG. 2 and FIG. 3, it was confirmed that in the solid electrolyte containing carbon cluster, favorable ion conductivity was secured at low temperature without relation to the carbon cluster type. In particular, it was found that higher ion conductivity was obtained in the case of using fullerene than in the case of using fullerene oxide.

The usage of the electrolyte of the embodiments is not limited to the battery, but may be an electrochemical device other than the battery. An example of another usage includes a capacitor.

Further, in the foregoing embodiment, the description has been given of the lithium ion secondary battery in which the anode capacity is expressed based on the capacity component based on inserting and extracting lithium as a battery of the present invention. However, the present embodiment is able to be similarly applied to a lithium metal secondary battery in which the anode capacity is expressed by the capacity component based on precipitation and dissolution of lithium, or a secondary battery in which the anode capacity includes the capacity based on inserting and extracting lithium and the capacity based on precipitation and dissolution of lithium, and the anode capacity is expressed by the sum of these capacities by setting the charge capacity of the anode material capable of inserting and extracting lithium to a smaller value than the charge capacity of the cathode.

Further, in the foregoing embodiment, the description has been given of the case using lithium as an electrode reactant for the battery of the embodiment. However, other Group 1 element such as sodium (Na) and potassium (K) in the long period periodic table, a Group 2 element such as magnesium and calcium (Ca) in the long period periodic table, or other light metal such as aluminum may be used. In this case, the anode material described in the foregoing embodiment is able to be used as an anode active material as well.

Further, in the foregoing embodiment, for the battery of the embodiment, the description has been given with the specific example of the coin type battery as a battery structure. However, the embodiment is able to be similarly applied to a battery having other battery structure such as a cylindrical battery, a laminated film battery, a square battery, and a button battery or a battery in which the battery element has a laminated structure, a spirally wound structure or the like. Further, the battery of the embodiment is not limited to the secondary battery, but is able to be similarly applied to other types of battery such as a primary battery.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electrolyte that is a solid electrolyte comprising:
   a carbon cluster and an electrolyte salt containing at least one of an alkali metal salt and an alkali earth metal salt.

2. The electrolyte according to claim 1, wherein the carbon cluster is at least one selected from the group consisting of fullerene, carbon nanotube, graphene, a hydride of fullerene, a hydride of carbon nanotube, a hydride of graphene, an oxide of fullerene, an oxide of carbon nanotube, an oxide of graphene, and defectives thereof.

3. The electrolyte according to claim 1, wherein the electrolyte salt contains the alkali metal salt, and the alkali metal salt is at least one of a lithium salt, a sodium salt, and a potassium salt.

4. The electrolyte according to claim 1, wherein the lithium salt includes at least one of lithium hexafluorophosphate (LiPF6), lithium tetrafluoroborate (LiBF4), lithium perchlorate (LiClO4), lithium hexafluoroarsenate (LiAsF6), lithium tetraphenylborate (LiB(C6H5)4), lithium bis(trifluoromethanesulfonyl)imide (LiN(CF3SO2)2), lithium bis(pentafluoroethanesulfonyl)imide (LiN(C2F5SO2)2), lithium (trifluoromethanesulfonyl)(pentafluoroethanesulfonyl)imide (LiN(CF3SO2)(C2F5SO2)), lithium (trifluoromethanesulfonyl)(heptafluoropropanesulfonyl)imide (LiN(CF3SO2)(C3F7SO2)), lithium (trifluoromethanesulfonyl)(nonafluorobutanesulfonyl)imide (LiN(CF3SO2)(C4F9SO2)), lithium 1,2-perfluoroethanedisulfonyl imide, lithium 1,3-perfluoropropanedisulfonyl imide, lithium 1,3-perfluorobutanedisulfonyl imide, lithium 1,4-perfluorobutanedisulfonyl imide, and lithium tris (trifluoromethanesulfonyl)methide (LiC(CF3SO2)3), or a mixture thereof.

5. The electrolyte according to claim 1, wherein the solid electrolyte is a mixture of
   a given amount of the carbon cluster, and
   a given amount of the electrolyte salt that is in a solid phase.

6. The electrolyte according to claim 1, wherein the solid electrolyte is a powdery mixture containing the carbon cluster and the electrolyte salt, or a substance obtained by compressing said powdery mixture.

7. A battery comprising:
   a cathode;
   an anode: and
   a solid electrolyte, wherein the solid electrolyte contains carbon cluster and an electrolyte salt containing at least one of an alkali metal salt and an alkali earth metal salt.

8. The battery according to claim 7, wherein the lithium salt includes at least one of lithium hexafluorophosphate (LiPF6), lithium tetrafluoroborate (LiBF4), lithium perchlorate (LiClO4), lithium hexafluoroarsenate (LiAsF6), lithium tetraphenylborate (LiB(C6H5)4), lithium bis(trifluoromethanesulfonyl)imide (LiN(CF3SO2)2), lithium bis(pentafluoroethanesulfonyl)imide (LiN(C2F5SO2)2), lithium (trifluoromethanesulfonyl)(pentafluoroethanesulfonyflimide (LiN(CF3SO2)(C2F5SO2)), lithium (trifluoromethanesulfonyl)(heptafluoropropanesulfonyl)imide (LiN(CF3SO2)(C3F7SO2)), lithium (trifluoromethanesulfonyl)(nonafluorobutanesulfonyl)imide (LiN(CF3SO2)(C4F9SO2)), lithium 1,2-perfluoroethanedisulfonyl imide, lithium 1,3-perfluoropropanedisulfonyl imide, lithium 1,3-perfluorobutanedisulfonyl imide, lithium 1,4-perfluorobutanedisulfonyl imide, and lithium tris (trifluoromethanesulfonyl)methide (LiC(CF3SO2)3), or a mixture thereof.

9. The battery according to claim 7, wherein the solid electrolyte is a mixture of
   a given amount of the carbon cluster, and
   a given amount of the electrolyte salt that is in a solid phase.

10. The battery according to claim 7, wherein the solid electrolyte is a powdery mixture containing the carbon cluster and the electrolyte salt, or a substance obtained by compressing said powdery mixture.

* * * * *